April 11, 1939.    W. B. KERRICK    2,154,002
ORCHARD HEATER
Filed Oct. 13, 1937    2 Sheets-Sheet 1

INVENTOR:
WALTER B. KERRICK
BY
ATTORNEY.

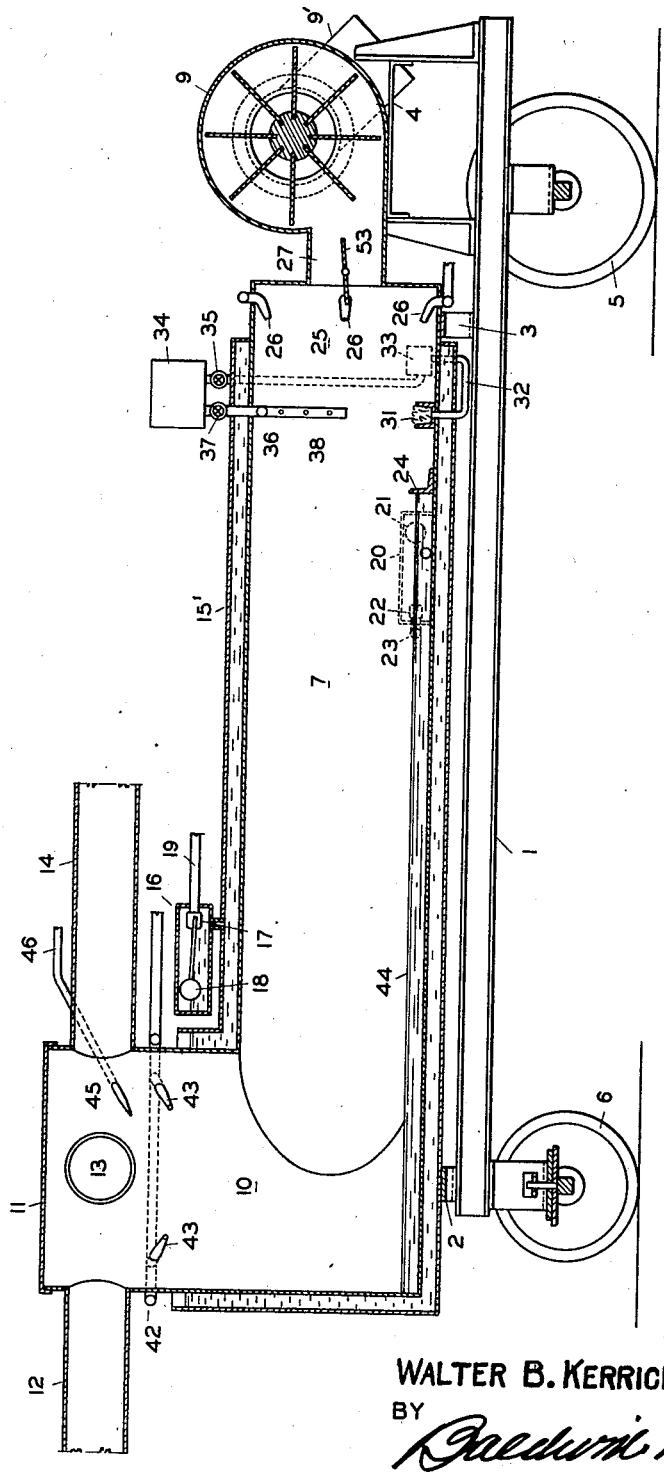

Patented Apr. 11, 1939

2,154,002

UNITED STATES PATENT OFFICE 2,154,002

ORCHARD HEATER

Walter B. Kerrick, Los Angeles, Calif.

Application October 13, 1937, Serial No. 168,768

3 Claims. (Cl. 47—2)

This invention relates to improvements in orchard heaters and the method of treating growing plants, and more particularly, to portable machines for the generation and distribution of heat to prevent frost formation.

Among the objects of this invention is to form and distribute a heavy fog that will form a cloud blanket within and over an orchard for the purpose of carrying and retaining the heat necessary to prevent the formation of frost during critical atmospheric conditions dangerous to plant growth.

Another object is to retard the fall of atmospheric temperature by the mechanical creation of a fog of water droplets, taking advantage of the high specific heat of water.

Another object is to supersaturate the atmosphere with fog so as to enable a high relative humidity being maintained in the subsequent period of rising temperature. It is important to prevent the drop in relative humidity usually attendant upon rise in temperature after a cold spell since this drop in relative humidity is responsible for the dried-out condition which is characteristic of "frozen" citrus fruits.

Another object is to eliminate the smoke nuisance incidental to smudge pots with their deleterious effect on plant and animal life.

Another object is to provide a mobile humidified heat generator with a distributing system capable of maintaining an atmospheric temperature safely above the frost point that is simple in construction and operation, and that may be easily installed and removed from an orchard as required.

Other objects and advantages will appear as the description progresses.

In this specification and the accompanying drawings, the invention is disclosed in its preferred form. But it is to be understood that it is not limited to this form, because it may be embodied in other forms within the purview of the claims following the description.

In the two sheets of drawings:

Fig. 2 is a vertical section of the same taken on the line II—II, Fig. 1.

Figure 1:
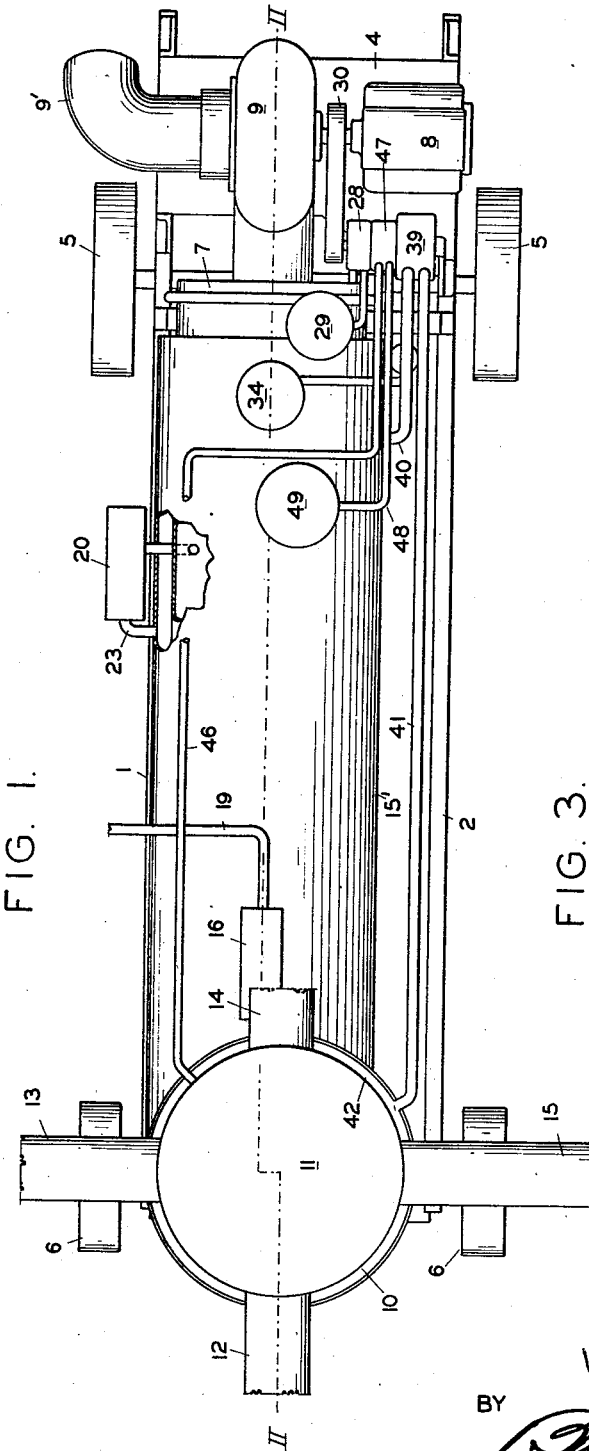
Fig. 1 is a plan view from above of an orchard heater constructed in accordance with this invention.
Figure 3:
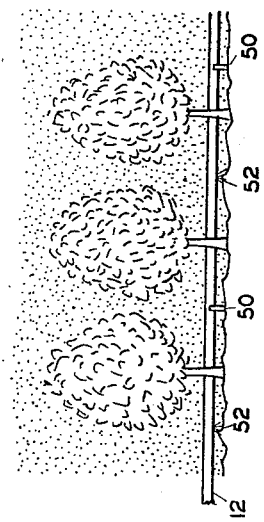
Fig. 3 is a diagrammatic view in elevation of an orchard showing a heat distributing conduit and its relation to the trees of the orchard.

The invention is schematically shown in the drawings to show the general arrangement and relation of parts, in preference to a closer adherence to mechanical structure and non-essential details.

The construction illustrated in the drawings, referring first to Fig. 2, comprises an orchard truck having the side bars 1 and 2 with the necessary cross bolsters and bracings such as 2, 3, 4. The frame is supported upon the rear wheels 5—5 and the pivotal front wheels 6—6. The cylindrical combustion chamber 7 is mounted longitudinally on the truck. A suitable motor unit 8, such as an internal combustion engine, is mounted to the rear of the combustion chamber and coupled to the blower 9 which discharges into the rear end of this chamber.

The front end of the combustion chamber discharges into the mixing chamber 10 which is closed at the bottom and provided with the cover 11 at the top. The lateral headers 12, 13, 14, and 15 lead outwardly from the top of the mixing chamber and are carried between the rows of trees in four directions for distances determined by the capacity of the machine. An area of about ten acres per unit is the most practical to insure mobility in installing the apparatus in anticipation of a frost.

The combustion chamber 7 and the mixing chamber 10 are surrounded by the water jacket 15', which is maintained full of water by the float chamber 16 having the valve 17 therein controlled by the float 18, to control the flow of water through the pipe 19 leading to a source of supply (not shown) which may be a service truck or an auxiliary tank mounted on the frame 1. Any other desirable form of water heater can be substituted for the water jacket 15'.

A similar float chamber 20 having the float 21 therein controlling the valve 22 in the pipe 23, leading from the water jacket 15, maintains an exposed sheet of water across the bottom of the combustion chamber 7 between the front wall of the mixing chamber and the dam 24 across the width of the combustion chamber at the bottom.

The rear end of the combustion chamber forms a fire box, as at 25, adapted to any form of available fuel. In the present instance, the fuel oil burners, such as 26—26, are introduced through the walls of the fire box and directed toward the longitudinal axis thereof, in the path of the blast from the blower 9 entering the fire box at 27. Fuel oil is fed to these burners by the pump 28 from the fuel supply tank 29. The pump is driven by the belt 30 encircling suitable pulleys on the shaft of the motor 8 and the shaft of the pump 28 respectively, see Fig. 1.

The fire box is provided with the pilot wick 31 to which fuel is fed through the pipe 32 under control of a suitable float chamber 33 and receiving its supply from the tank 34 having the shut off valve 35. The gravity fuel pipe 36 having the shut off valve 37 leads from the fuel tank 34 to the jet pipe 38 immediately above the wick 31 so that fuel oil jetting from the pipe 38 will be ignited by the pilot wick 31, providing preliminary warming of the combustion chamber; after which the blower 9 can be started and the fuel oil burners 26 ignited for the generation of the necessary fire box heat, as hereinafter more fully described.

The pump 39, driven in tandem with the pump 28, has its intake 40 connected with the water jacket 15 and its outlet 41 discharging into the annular manifold 42 surrounding the mixing chamber.

The jets 43—43, provided in the manifold, are directed into the mixing chamber and are arranged to inject atomized water into the escaping products of combustion. The body of water 44 in the bottom of the combustion chamber 7 serves to raise the humidity of the products of combustion to near the saturation point prior to the injection of atomized water thereinto at 43.

Insecticides and/or fertilizing chemicals can also be sprayed into the mixing chamber through the nozzle 45 on the outlet pipe 46 from the pump 47 having the inlet 48 connected with the chemical tank 49. The pumps 28, 47, and 39 are run in tandem by the belt 30 driven by the motor 8. These chemicals are chosen according to the purpose to be served. Sulphur and nitrogen compounds desirable as plant food and conventional insecticides may be used. The carbon dioxide gas in the products of combustion is itself a plant food. Many such chemicals could be added to the water in the water jacket 15 and atomized at the jets 43—43 instead of by the independent control through the jet 45. The method of injecting the chemicals is optional or determined by the nature of the chemicals. Some may be more effective when independently added to the ultimate fog generated in the unit rather than by direct solution in the water from which the fog is generated.

The various headers 12—15 are supported at intervals on the standards 50 driven into the ground and having yoke heads to fit the curvature of the headers. The headers are provided at intervals with outlet openings 52 in their lower sides for the discharge of the fog generated in the machine. If possible, these openings should be adjacent the trees so that the emerging fog will rise up through the foliage of the trees, which will tend to retard the rise of the fog. Placing the openings in the lower side of the headers is also desirable to permit any condensation within the headers to drain out on to the ground.

This invention operates substantially as follows:

When the season of expected frost arrives, the machine is towed into the orchard to the approximate center of the area to be heated. The headers 12—15 are then attached to the top of the mixing chamber and laid down between the rows of trees in their respective directions. When atmospheric conditions indicate the probable appearance of frost, the pilot wick 31 is ignited, the flame from which generates sufficient heat to vaporize and ignite the volatile fuel oil discharged from the spraying pipe 38. After preliminary warming of the fire box 25 to insure proper ignition and combustion of the larger volume of fuel, the motor 8 is started which actuates the pump 28 to supply fuel to the burners 26—26 that is ignited by the flame from the jet 38. When combustion is well under way, the throttle of the engine is opened wider. This increases the output from the blower 9, sending an air blast through the fire box to carry the products of combustion through the combustion chamber 7, heating the water in the jacket 15, which is forced by the pump 39 through the jets 43—43. The combustion chamber is set slightly tangential to the cylindrical mixing chamber to set up a whirling motion therein, the better to mix the products of combustion with the water vapor rising from the surface 44 and the atomized water from the spray nozzles 43—43 before escaping into the headers 12 to 15. The length of the combustion chamber 7 insures the complete combustion of the fuel so that the products of combustion are free from smoke. The efficiency of water in absorbing heat is taken advantage of by atomizing the water directly into the products of combustion and forming a very heavy, water phase fog, the specific gravity of the droplets of which will cause it to form a fog bank close to the surface of the ground in such a manner that it will linger in the foliage of the trees. The water is atomized into the mixing chamber 10 in preference to the chamber 7 to prevent the formation of relatively dryer steam or vapor instead of the more desirable wet fog.

Such a fog blanket will eventually precipitate, but will have slight tendency to drift away because of the usual absence of wind during a frost period. It is well known that the presence of a high degree of moisture tends to retard the fall of atmospheric temperature. This invention not only furnishes hot products of combustion to raise the atmospheric temperature, but also provides moisture whose high specific heat retards the subsequent lowering of the temperature of the atmosphere.

The fact that frost bitten citrus fruit is dried out and marked by the reduction of its juices, indicates low atmospheric humidity to be the prime deleterious factor in a period of low temperatures. On the other hand, fruit which has been frozen and surrounded by a coating of ice does not show this loss of juices. The usual lack of humidity is most pronounced when the temperature rises after a cold spell. Air which may be saturated with water vapor at freezing temperatures will, without loss of actual water vapor, show an extremely low relative humidity when the temperature rises to the normal range.

The water droplets, constituting the fog which is mechanically generated under the present invention, evaporate as the temperature rises and maintain the atmosphere comparatively humid throughout the rise to normal temperature.

The presence of this fog blanket permeating the atmosphere of an orchard in intimate contact with the foliage presents an opportunity to suspend desirable chemicals in this artificial fog which will condense upon the foliage and attack the insects and insect spores of the enemies of the trees.

Inasmuch as the foliage and perhaps the bark of the trees have the capacity to absorb plant food from the atmosphere, insecticidal chemicals can be chosen that feed the trees by this absorption.

By the usual throttle control of the motor 8, the fog output of the machine can be controlled to a nicety after the desired fog blanket has been created in the orchard so that the output of the machine may be regulated to balance the condensation and dissipation of the fog. A further control of the blast from the blower 9 is provided by means of the damper 53 in the outlet 27. The swiveled intake elbow 9' of the blower if directed downwardly will cause an upward circulation and heating of the colder air near the ground. This cold lower stratum, when static, is an extra frost hazard.

With the fuel, water, and chemical supply pumps thus driven by the engine, which also controls the blower, the performance of the machine is practically under automatic control of the engine speed. This leaves the operator free to run a service truck to supply water to the machine after it is started.

This invention has been disclosed as a frost prevention method. It is also effective in extreme, dry, high temperature to prevent sun burning of tropical fruit and foliage which are adapted to moist climates. When thus used, the evaporation of the fog blanket in summer heat will lower the atmospheric temperature.

It is equally effective as a germicide or insecticide fog, apart from its relation to temperature, especially in fighting boll weevil and other pests that live beneath the foliage where they and their eggs are protected against wet spraying and dry powder insecticides. They cannot escape a permeating atmosphere saturated with humidity condensing into poison liquid.

"Water phase fog" is intended to distinguish from smoke clouds as given off by smudge pots. "Blanket" defines a cloud of fog that will stratify in the atmosphere and remain near the ground and not readily rise and dissipate therein in the absence of wind.

Water soluble insecticides and plant foods are preferred in order to maintain the higher specific gravity and specific heat of the fog. But dry powders, such as sulphur, could be introduced into the fog flowing from the machine with desirable results.

Having thus described the invention, what is claimed and desired to be secured by Letters Patent is:

1. An orchard heater including a combustion chamber; a liquid container in said chamber and forced draft means discharging into said chamber.

2. An orchard heater including a mixing chamber; a combustion chamber discharging into said mixing chamber; a water heater discharging into said mixing chamber; a motor; a blower driven by said motor and discharging into said combustion chamber; and a pump driven by said motor and connected with said heater.

3. An orchard heater including a mixing chamber; a combustion chamber discharging into said mixing chamber; a motor; a water heater; a fuel pump; a water pump; a chemical pump; a blower, said pumps and blower being synchronously driven by said motor, all so constructed and arranged that said water heater and chemical pump discharge into said mixing chamber and said fuel pump and blower discharge into said combustion chamber.

WALTER B. KERRICK.